US012478969B2

(12) United States Patent
Marquez et al.

(10) Patent No.: US 12,478,969 B2
(45) Date of Patent: Nov. 25, 2025

(54) DEVICE FOR HEATING SAMPLE

(71) Applicant: SEEGENE, INC., Seoul (KR)

(72) Inventors: Luis Marquez, Providence, RI (US); Bruce Frohman, Plymouth, MN (US)

(73) Assignee: SEEGENE, INC., Seoul (KR)

( * ) Notice: Subject to any disclaimer, the term of this patent is extended or adjusted under 35 U.S.C. 154(b) by 686 days.

(21) Appl. No.: 17/956,692

(22) Filed: Sep. 29, 2022

(65) Prior Publication Data

US 2024/0109070 A1 Apr. 4, 2024

(51) Int. Cl.
*B01L 7/00* (2006.01)
*H05B 3/34* (2006.01)
*F25B 21/02* (2006.01)

(52) U.S. Cl.
CPC ................ *B01L 7/525* (2013.01); *H05B 3/34* (2013.01); *B01L 2300/1822* (2013.01); *F25B 21/02* (2013.01); *H05B 2203/037* (2013.01)

(58) Field of Classification Search
CPC ..... B01L 7/52; B01L 2300/1822; H05B 3/34; H05B 2203/037
See application file for complete search history.

(56) References Cited

U.S. PATENT DOCUMENTS 4,865,986 A * 9/1989 Coy ........................ F25B 21/02 422/63
4,950,608 A * 8/1990 Kishimoto ......... G05D 23/1919 219/439
5,410,130 A * 4/1995 Braunstein ................ B01L 7/52 219/521
5,459,300 A * 10/1995 Kasman .............. B01L 3/50851 435/809
5,475,610 A * 12/1995 Atwood .............. B01L 3/50851 422/943
5,670,120 A * 9/1997 Degenhardt ........ B01L 3/50851 422/561
6,140,613 A * 10/2000 Tsuno ................. B01L 3/50851 422/131
6,558,947 B1 * 5/2003 Lund ......................... B01L 7/54 435/303.1
6,764,818 B2 * 7/2004 Lafferty .............. B01L 3/50851 219/676
6,940,055 B2 * 9/2005 Kwasnoski ............... B01L 7/00 219/709
7,074,367 B2 * 7/2006 Lurz ................... B01L 3/50853 436/155
7,252,803 B2 * 8/2007 Guthrie ................... B04B 15/02 206/562
7,452,712 B2 * 11/2008 Fawcett ................. C12Q 1/686 435/303.1
7,560,273 B2 * 7/2009 Sandell ............... B01L 3/50853 435/303.1

(Continued)

*Primary Examiner* — Jonathan M Hurst
(74) *Attorney, Agent, or Firm* — Sughrue Mion, PLLC

(57) ABSTRACT

A device for heating a sample according to the present disclosure includes: a thermal block unit accommodating a reaction vessel; a heat transfer module thermally connected to the thermal block unit; and a heat sink thermally connected to the heat transfer module, wherein the thermal block unit includes: a thermal block having a plurality of accommodating portions for accommodating the reaction vessel; and a heating plate having a plurality of holes into which the plurality of accommodating portions are inserted.

14 Claims, 6 Drawing Sheets

(56) References Cited

U.S. PATENT DOCUMENTS

| | | | | |
|---|---|---|---|---|
| 7,632,464 | B2 * | 12/2009 | Banerji | B01L 9/523 422/550 |
| 8,676,383 | B2 * | 3/2014 | Tan | G01N 21/6452 435/303.1 |
| 9,416,345 | B2 * | 8/2016 | Moore | B01L 7/00 |
| 9,468,927 | B2 * | 10/2016 | Dromaretsky | B01L 7/52 |
| 10,471,431 | B2 * | 11/2019 | Lim | C12Q 1/6806 |
| 10,835,901 | B2 * | 11/2020 | Shin | B01L 7/52 |
| 2006/0065652 | A1 * | 3/2006 | Brown | B01L 7/52 219/478 |
| 2017/0008000 | A1 * | 1/2017 | Kim | B01L 7/5255 |

* cited by examiner

DEVICE FOR HEATING SAMPLE

TECHNICAL FIELD

The present disclosure relates to a device for heating a sample.

BACKGROUND ART

Recently, people's interest in health have been growing along with prolonged human life expectancy. Thus, the importance of accurate analysis of pathogens and in vitro nucleic acid-based molecular diagnosis such as genetic analysis for a patient has increased significantly, and the demand therefor is on the rise.

Generally, nucleic acid-based molecular diagnosis is performed by extracting nucleic acids from a sample and confirming whether a target nucleic acid is present in the extracted nucleic acids.

The most widely used nucleic acid amplification reaction, which is well-known as a Polymerase Chain Reaction (PCR), repeats a cyclic process which includes denaturation of a double-stranded DNA, annealing of an oligonucleotide primer with a denatured DNA template, and extension of the primer by a DNA polymerase (Mullis et al.; U.S. Pat. Nos. 4,683,195, 4,683,202 and 4,800,159; Saiki et al., (1985) Science 230, 1350-1354).

Recently, various nucleic acid amplification apparatuses have been developed for performing a nucleic acid amplification reaction. An example of a nucleic acid amplification apparatus is configured to mount a vessel containing a sample solution including a template nucleic acid in one reaction chamber, and to perform a nucleic acid amplification reaction by repeatedly heating and cooling the vessel.

In order to amplify a deoxyribonucleic acid (DNA) having a specific nucleotide sequence, the apparatus for a nucleic acid amplification reaction may perform a denaturing step, an annealing step, and an extension (or amplification) step.

The DNA denaturation is performed at about 95° C., and the annealing and extension of primers are performed at a temperature of 55° C. to 75° C. which is lower than 95° C. Therefore, the reaction vessels or chambers containing samples are heated and then cooled repeatedly in order to perform a nucleic acid amplification reaction.

In order to perform a nucleic acid amplification reaction on a plurality of samples, a thermal block having a plurality of sample wells is used in some cases. A reaction vessel for accommodating the samples is inserted in the plurality of sample wells. That is, by inserting the reaction vessel into the sample wells of the thermal block, and heating or cooling the thermal block using, for example, a Peltier device, the nucleic acid amplification reaction of each sample is performed simultaneously. In general, from a top view, the sample wells of the thermal block are arranged in rows and columns, in the form of 4×4 for 16 wells, 4×8 for 32 wells, 8×8 for 64 wells, 8×12 for 96 wells, and largely by 364 wells of 16×24.

A thermal block, also referred to as a heating block, is fabricated of a metal for rapid heat conduction. A reaction vessel is inserted into the wells of the thermal block, and the nucleic acid amplification reaction of each sample is performed simultaneously. At this time, it is important to uniformly control the temperature of all samples.

However, when comparing the central portion of the thermal block with the rest of the outer edge portion of the thermal block, the heat capacity of the central portion is greater than that of the outer edge portion. Accordingly, there is a structural limitation that the temperature of the central portion rises later than the outer edge portion when heating the thermal block, and the temperature of the central portion decreases later than the outer edge portion when cooling the thermal block.

For this reason, it is difficult to uniformly control the temperature of the samples located near the central portion and the samples near the outer edge portion. The difference in the temperature range maintained between the samples gets larger as the response delay increases due to the temperature change in the central portion. As a result, the performance of the apparatus for performing the nucleic acid amplification reaction is degraded. In particular, this problem increases as the size of the thermal block increases.

The PCR reaction is a reaction amplifying a target nucleic acid by repeating steps of hybridizing a specific primer to a target nucleic acid sequence, extending it by a polymerase, and subsequently separating extended strands. In a PCR reaction, this series of steps is performed efficiently by maintaining the reaction mixture at each designated temperature for set periods of time. Thus, it is very important to maintain accurate temperatures for each step in the PCR reaction, because the amplification efficiency in each cycle may decrease when the accurate temperature is not maintained for each step, In particular, when the same test is performed on a plurality of samples using the PCR reaction, temperature deviation which continuously occurs among the wells may cause the amplification reaction to proceed with different efficiencies for each of the plurality of samples subjected to the amplification reaction in different wells. Since the PCR reaction repeats tens of cycles of nucleic acid amplification, and a DNA strand generated in a cycle serves as a DNA template in the subsequent cycle, the difference in amplification efficiency occurring in each cycle may greatly affect the analysis result.

Accordingly, there has been a demand for the development of a device for heating a sample (hereinafter, also referred to as "sample heating apparatus") capable of increasing the efficiency of the nucleic acid amplification reaction and the performance of the apparatus by uniformly controlling the temperature while minimizing the temperature deviation between the samples, in particular, the temperature deviation between the central portion and the outer edge portion of the thermal block.

PRIOR ART DOCUMENT

Patent Document (Patent document 1) U.S. Pat. No. 8,236,504 (Aug. 7, 2012)

SUMMARY OF INVENTION

Technical Task

As mentioned in the background art described above, the present disclosure is directed to provide a sample heating apparatus that is capable of uniform temperature control.

However, the technical tasks to be solved by the present disclosure are not limited to the aforementioned technical task.

Means for Solving the Task

According to one aspect of the present disclosure, the present disclosure may provide a device for heating a sample including: a thermal block unit accommodating a reaction vessel; a heat transfer module thermally connected to the thermal block unit; and a heat sink thermally connected to the heat transfer module, wherein the thermal block unit comprises: a thermal block having a plurality of accommodating portions for accommodating the reaction vessel; and a heating plate having a plurality of holes into which the plurality of accommodating portions are inserted.

Further, the heating plate may include an edge region and a central region, the edge region having a greater power density than the central region.

Further, the heating plate may be a flexible printed circuit board (FPCB).

Further, the thermal block may include a base portion, and the plurality of accommodating portions are formed protruding from the base portion.

Further, the plurality of accommodating portions may each include a cylindrical body and a conical recess formed in the cylindrical body.

Further, an edge insulator enclosing the periphery of the base portion may be further included.

Further, the base portion may be thermally connected to the heat transfer module via a heat conducting layer.

Further, the heat transfer module may include a Peltier element.

Further, a clamp coupled to the edge insulator may be further included.

Further, the clamp may be installed to press the base portion.

Further, a heat insulating plate, having a plurality of holes into which the plurality of accommodating portions is inserted, may be further included.

Further, the heat insulating plate may be a porous polymer.

Further, the porous polymer may be a silicone sponge.

Further, the heating plate may be disposed between the heat insulating plate and the base portion.

Effect of Invention

According to an embodiment of the present disclosure, the temperature may be controlled uniformly by providing a thermal block unit with a heating plate. In particular, it is possible to effectively remove the edge effect which may occur in the thermal block, by designing the heating plate so that the power density of an edge region is greater than the power density of a central region.

Thus, it is possible to increase the efficiency of the nucleic acid amplification reaction and the performance of the apparatus by minimizing the difference between the temperature change rate and the temperature maintaining period between the samples.

DETAILED MEANS FOR CARRYING OUT THE INVENTION

Figure 1:
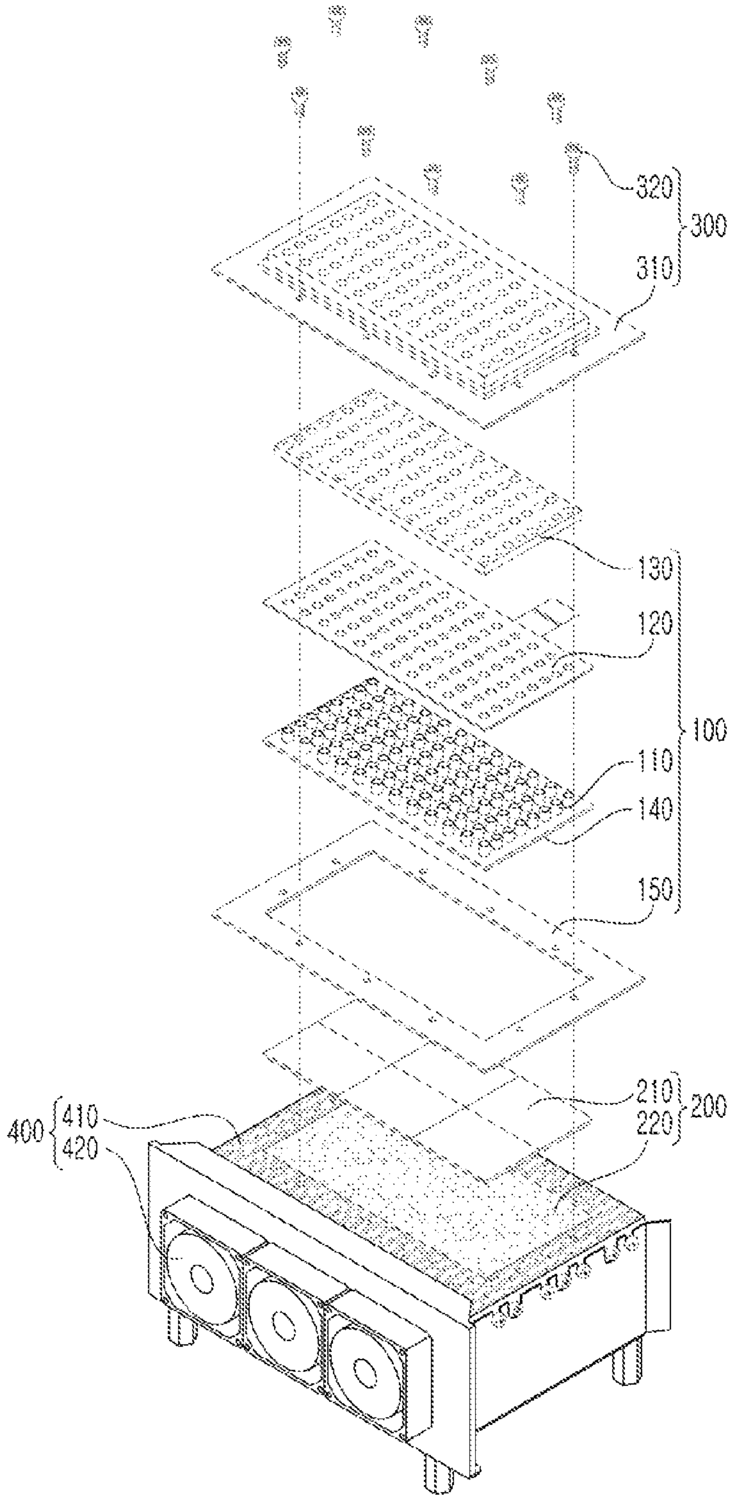
FIG. 1 is an exploded perspective view for describing a configuration of a sample heating apparatus according to an embodiment of the present disclosure.

Hereinafter, the present disclosure will be explained with reference to embodiments and example drawings. The embodiments are for illustrative purposes only, and it should be apparent to a person having ordinary knowledge in the art that the scope of the present disclosure is not limited to the embodiments.

In addition, in adding reference numerals to the components of each drawing, it should be noted that same reference numerals are assigned to same components as much as possible even though they are shown in different drawings. In addition, in describing the embodiments of the present disclosure, when it is determined that a detailed description of a related well-known configuration or function interferences with the understanding of the embodiments of the present disclosure, the detailed description thereof will be omitted.

In addition, in describing the components of the embodiments of the present disclosure, terms such as first, second, A, B, (a), (b), (i), (ii), etc. may be used. These terms are only for distinguishing the components from other components, and the nature or order of the components is not limited by the terms. When a component is described as being "connected," "coupled" or "fastened" to other component, the component may be directly connected or fastened to the other component, but it will be understood that another component may be "connected," "coupled" or "fastened" between the components.

As used herein, the term "sample heating apparatus" refers to an apparatus having a thermal block and a heating means, which can be used to uniformly control the temperature of samples. As used herein, the term "sample" may include a biological sample (e.g., cells, tissues and fluids from a biological source) and a non-biological sample (e.g., food, water and soil). Examples of the biological sample may include viruses, bacteria, tissues, cells, blood (e.g., whole blood, plasma and serum), lymph, bone marrow fluid, *salvia*, sputum, swab, aspiration, milk, urine, feces, ocular fluid, semen, brain extract, spinal fluid, joint fluid, thymus fluid, bronchoalveolar lavage fluid, ascites and amniotic fluid. Also, the sample may include natural nucleic acid molecules isolated from a biological source and synthetic nucleic acid molecules. According to an embodiment of the present disclosure, the sample may include an additional substance such as water, deionized water, saline solution, pH buffer, acid solution or alkaline solution.

As used herein, the term "reaction vessel" refers to a unit capable of containing a reactant (e.g., a reaction solution or reaction mixture). A test tube, a PCR tube, a strip tube, a vial, a multi-well PCR plate, a microtiter plate, a capillary tube, are all examples of a reaction vessel. One or more reaction vessels may be used in the device for heating a sample according to the present disclosure.

In addition, as used herein, the term "thermal block" may be used as an accommodating body which accommodates one or more reaction vessels formed to fit in a plurality of sample wells formed on the thermal block. According to an embodiment of the present disclosure, the thermal block may be fabricated of a material having excellent thermal conductivity and such. The thermal block may be fabricated of a metal or metal alloy (for example, iron, copper, aluminum, gold, silver, or an alloy containing the same). The thermal block may be machined from a single piece of solid metal, or may be formed by connecting several pieces of metal.

The thermal block of the present disclosure is a thermal block for performing a plurality of reactions. The reaction refers to a chemical, biochemical, or biological transformation involving at least one chemical or biological substance (for example, a solution, a solvent, an enzyme). In the present disclosure, the reaction may preferably be a reaction that is initiated, stopped, promoted or inhibited by a thermal change in the reaction system. For example, the reaction may be a reaction in which decomposition or binding of a biological or chemical substance is carried out according to temperature change, or a reaction in which the activity of an enzyme that performs the production or decomposition of a biological or chemical substance is promoted or inhibited according to temperature change.

Specifically, the reaction may refer to an amplification reaction. The amplification reaction may be a reaction that increases the target analyte (for example, nucleic acid) itself, or may be a reaction that increases or decreases a signal generated depending on the presence of the target analyte. A reaction that increases or decreases a signal generated depending on the presence of the target analyte may or may not be accompanied by an increase in the target analyte. Specifically, the target analyte is a nucleic acid molecule, and the reaction may be a polymerase chain reaction (PCR) or real-time PCR.

In general, the polymerase chain reaction (PCR) is performed by repeating a cycle including a reaction including a denaturation step of a nucleic acid, a binding step (hybridization or annealing) of a nucleic acid and a primer, and an extension step of a primer. As used herein, the term "cycle" refers to a unit of change in condition or a unit of repetition of change in condition when performing a plurality of measurements accompanied by a certain change in condition. The certain change in condition or repetition of change in condition includes, for example, a change or repetition of the change in temperature, reaction time, number of reactions, concentration, pH, and the number of copies of the objects to be measured (for example, target nucleic acid molecule). In this case, the certain change in condition is an increase in the number of repetitions of the reaction, and the repetition unit of the reaction including the series of above steps is set as one cycle.

Various nucleic acid amplification reactions can be performed using the sample heating apparatus of the present disclosure. The reactions are carried out by, for example, polymerase chain reaction (PCR), ligase chain reaction (LCR, see Wiedmann M, et al., "Ligase chain reaction (LCR)—overview and applications." PCR Methods and Applications 1994 February; 3(4):S51-64), gap filling LCR (GLCR, see WO 90/01069, EP 439162 and WO 93/00447), Q-beta replicase amplification (Q-beta, see Cahill P, et al., Clin Chem., 37(9): 1462-5 (1991), U.S. Pat. No. 5,556,751), strand displacement amplification (SDA, see G T Walker et al., Nucleic Acids Res. 20(7):1691-1696 (1992), EP 497272), nucleic acid sequence-based amplification (NASBA, see Compton, J. Nature 350(6313): 912 (1991)), Transcription-Mediated Amplification (TMA, see Hofmann W P et al., J Clin Virol. 32(4):269-93 (2005); U.S. Pat. No. 5,666,779) or Rolling Circle Amplification (RCA, see Hutchison C. A. et al., Proc. Natl Acad. Sci. USA. 102: 17332-17336 (2005)).

In particular, the sample heating apparatus of the present disclosure is used conveniently for PCR-based nucleic acid amplification reactions. Various nucleic acid amplification methods based on PCR are known. For example, quantitative PCR, digital PCR, asymmetric PCR, reverse transcriptase PCR (RT-PCR), a differential display PCR (DD-PCR), nested PCR, multiplex PCR, SNP genomic typing PCR, and the like are included.

The sample heating apparatus according to an embodiment of the present disclosure may be installed and used in an apparatus for detecting a target analyte. The apparatus for detecting a target analyte according to an embodiment may be an apparatus for detecting an optical signal generated by performing a nucleic acid amplification reaction and a reaction generating an optical signal depending on the presence of a nucleic acid, which accompany change in temperature.

First, referring to FIG. 1, the main configuration of a sample heating apparatus according to an embodiment of the present disclosure will be described. FIG. 1 is an exploded perspective view for describing the configuration of a sample heating apparatus according to an embodiment of the present disclosure.

As shown in FIG. 1, the sample heating apparatus includes a thermal block unit 100, a heat transfer module 200, a clamping unit 300, and a heat dissipation unit 400.

First, the thermal block unit 100 according to an embodiment of the present disclosure uniformly controls the temperature of a reactant in a reaction vessel (not shown) accommodated in the thermal block unit 100, to carry out a nucleic acid reaction. The thermal block unit 100 includes a thermal block 110 having a plurality of accommodating portions for accommodating a reaction vessel, and a heating plate 120 having a plurality of holes into which the plurality of accommodating portions are inserted. The thermal block unit 100 according to an embodiment of the present disclosure may further include at least one of: a heat insulating plate 130, a first heat conductive layer 140, and an edge insulator 150.

Figure 2:
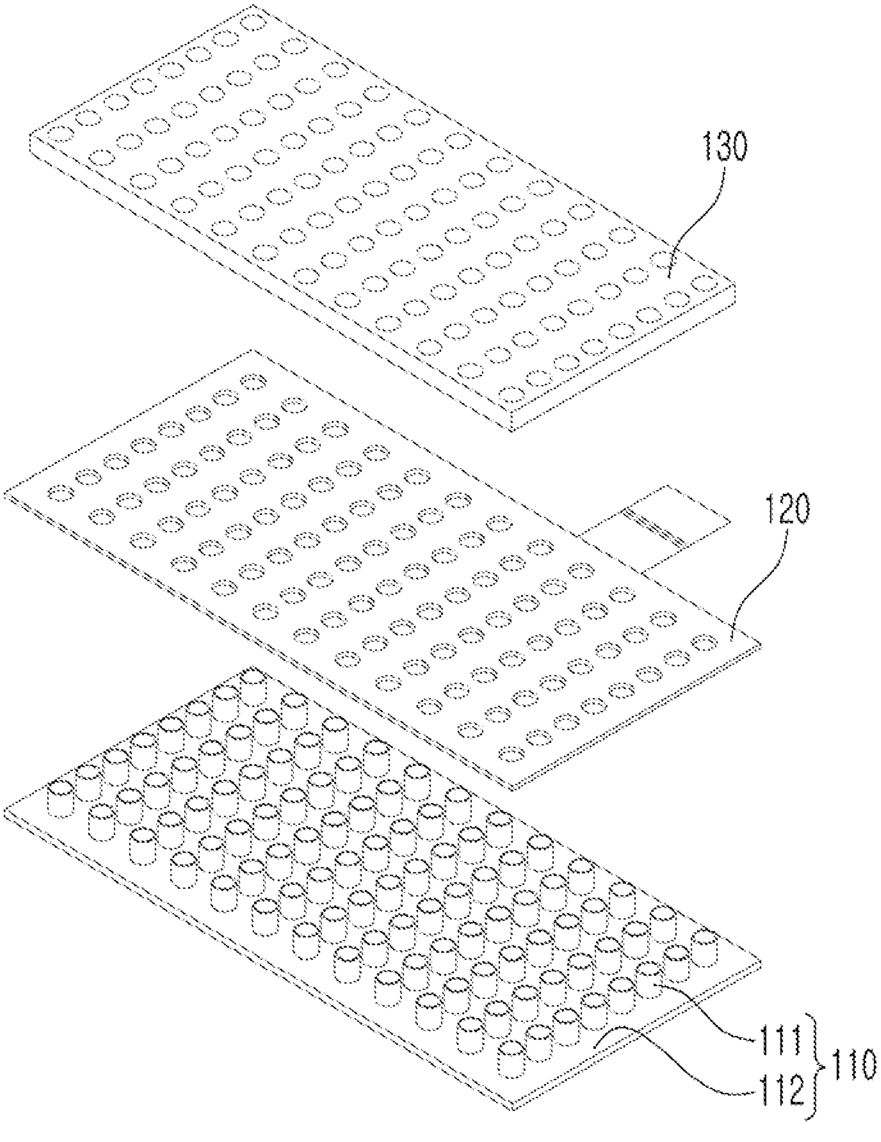
FIG. 2 is an exploded perspective view for describing a portion of a thermal block unit according to an embodiment of the present disclosure.

A portion of the thermal block unit 100 according to an embodiment of the present disclosure will be further described with reference to FIG. 2. FIG. 2 is an exploded perspective view for describing a portion of the thermal block unit 100 according to an embodiment of the present disclosure.

As shown in FIG. 2, the thermal block 110 of the thermal block unit 100 may include a base portion 112, and the plurality of accommodating portions 111 may protrude from the base portion 112. Such accommodating portions 111 formed to protrude may be inserted into a plurality of holes formed in the heating plate 120. That is, the plurality of holes formed in the heating plate 120 are formed to correspond to the arrangement of the plurality of accommodating portions 111.

In addition, the diameter of the plurality of holes of the heating plate 120 is preferably greater than or equal to the diameter of the accommodating portion 111 of the thermal block 110. Accordingly, the heating plate 120 may heat the reaction vessel while surrounding each accommodating portion 111.

A lower surface of the heating plate 120 may be positioned in close contact with an upper surface of the base portion 112 of the thermal block 110. In another embodiment, another thermally conductive layer may be further configured between the lower surface of the heating plate 120 and the base portion 112 of the thermal block 110.

According to an embodiment, the thermal block 110 is fabricated using a material having excellent thermal capacity and thermal conductivity. The thermal block 110 may be fabricated of a metal or a metal alloy (for example, iron, copper, aluminum, gold, silver, or an alloy including the same).

In this case, the power density of the edge region of the heating plate 120 may be greater than the power density of the central region. Here, the power density refers to the amount of power processed according to a unit of volume, and may be quantified in units such as watts per cubic meter (W/m 3) or watts per cubic inch (W/in 3).

Further, the edge region here refers to an area along the periphery of the heating plate 120, the area having a predetermined width. The central region refers to the other region excluding the edge region of the heating plate 120. In another embodiment, the central region may be further divided into detailed areas to design a printed circuit board.

In an embodiment of the present disclosure, the heating plate 120 may be a printed circuit board, as a heating element, and more specifically, may be a flexible printed circuit board (FPCB). An FPCB refers to a circuit pattern formed on a substrate such as a polyimide having flexibility. That is, the heating plate 120 may be a flexible heater specifically designed to be installed on a thermal block 110 of the present disclosure. As mentioned previously, the accommodating portions 111 protruding from the base portion 112 of the thermal block 110 may be inserted into a plurality of holes formed in the heating plate 120.

In an embodiment of the present disclosure, the heating plate 120 may be a flexible heater that includes an etched-foil resistive heating element laminated between layers of flexible insulation. The heating plate 120 may be rectangular in shape, having a length and width that is greater than or equal to that of the thermal block 110. The plurality of holes formed in the heating plate 120 may be laser-cut holes into which the accommodating portions 111 of the thermal block 110 are inserted.

The heating plate 120 may be specifically designed to have a profiled heat pattern to provide heat to the accommodating portions, and in particular, with a higher watt density in the edge region than the central region. The profiled heat pattern may include electrical paths for conducting and providing desired amount of heat to desired areas of the thermal block 110. Electrical paths may be formed around each of the plurality of holes of the heating plate 120, for providing heat to each of the protruding accommodating portions 111, and also may be formed along the edge region of the heating plate 120, for providing heat to the periphery of the thermal block 110.

An optimal watt density of the edge region may be determined to compensate for edge loss and equalize the temperature within the thermal block 110. In one embodiment, the optimal watt density of the edge region may be 10~30%, and more preferably, about 20% higher than the central region of the thermal block 110.

Accordingly, it is possible to more easily maintain a high temperature at the edge portion, that is, the edge region, of the thermal block 110 through which heat can escape more easily. Therefore, the temperature of the entire thermal block 110 can be uniformly controlled.

The shape and size of the thermal block 110 and the heating plate 120 may vary depending on the arrangement of the reaction vessel used for the nucleic acid reaction, to which heat is to be transferred. For example, the size of the thermal block 110 and the heating plate 120 may be large enough to cover all of the well area of a conventional 96-well plate.

The thermal block unit 100 according to an embodiment of the present disclosure may further include a heat insulating plate 130 having a plurality of holes into which the plurality of accommodating portions 111 are inserted. The heat insulating plate 130 may be fabricated of a porous polymer, for example, a silicone sponge. The heat insulating plate 130 is positioned on the heating plate 120 to prevent heat from the heating plate 120 from escaping upwards.

Similarly to the thermal block 110 and the heating plate 120, the heat insulating plate 130 may also have a different shape and size depending on the arrangement of the reaction vessel. For example, when the size of the thermal block 110 and the heating plate 120 is a size large enough to cover the entire well area of a conventional 96-well plate, the heat insulating plate 130 may also be fabricated to have a corresponding size and an arrangement of holes.

As shown in FIG. 2, the heating plate 120 may be positioned between the heat insulating plate 130 and the base portion 112. Accordingly, it is possible to reduce the influence of the external temperature on the temperature of the thermal block 110, while also reducing heat transfer from the heating plate 120 to the external environment.

Referring back to FIG. 1, a first heat conductive layer 140 may be provided on the lower surface of the base portion 112 of the thermal block 110. Here, the first heat conductive layer 140 may include thermally conductive components, for example, a heat conductive plate, foil, film, grease, or the like. Also, in an embodiment of the present disclosure, the first heat conductive layer 140 may be thermal paste.

An edge insulator 150 may be provided around the first heat conductive layer 140 and/or base portion 112. The edge insulator 150 may be fabricated of a heat insulating material. Accordingly, the edge insulator 150 may prevent heat from the first heat conductive layer 140 and/or the base portion 112 from being transferred out to the external environment.

A heat transfer module 200 may be provided below the edge insulator 150 and the first heat conductive layer 140. The heat transfer module 200 may be a device capable of both heating and cooling. In an embodiment of the present disclosure, the heat transfer module 200 may include a thermoelectric element 210 capable of both supplying and absorbing heat to the thermal block 110. In another embodiment, the heat transfer module 200 may separately include a heat supply means for supplying heat and a heat absorption means for absorbing heat.

In an embodiment of the present disclosure, thermoelectric element 210 can serve as a heating element to supply heat, as well as a cooling element to absorb heat, when electrical energy is provided thereto. In response to the heating and cooling of the thermoelectric device 210, the thermal block 110 can transfer heat to and absorb heat from the reaction vessel accommodated in the accommodating portion 111.

In an embodiment of the present disclosure, a plurality of thermoelectric elements 210 may be provided to supply and absorb heat. Such thermoelectric elements 210 may be electrically connected to a power module to generate heat using the power provided from the power module. For example, the thermoelectric element 210 may be a Peltier element controlled by a controller. The Peltier element may be positioned in the form of a plate at the bottom of the thermal block 110. In another embodiment, the thermoelectric element 210 may have a polygonal plate shape having an area sufficient to cover a specific area of the thermal block 110.

The term "thermally connected" used in relation to the thermal block 110 and the thermoelectric element 210 (and the heat transfer module 200) refers to the thermoelectric element 210 being directly or indirectly connected or in contact with the thermal block 110 so as to be able to exchange, transfer, or conduct heat.

The thermoelectric element 210 is disposed at a position capable of controlling the temperature of the thermal block 110. That is, the thermal block 110 and the thermoelectric element 210 for controlling the temperature of the thermal block 110 are positioned in a thermally connected state. In an embodiment of the present disclosure, the thermoelectric element 210 may be disposed under the thermal block 110.

According to an embodiment, one or more thermoelectric elements 210 may be disposed under the thermal block 110. When a plurality of thermoelectric elements 210 are provided, each of the plurality of thermoelectric elements 210 may be independently controlled or may be controlled as a whole as one thermoelectric element 210. The thermal block 110 and the thermoelectric element 210 may be thermally connected via a first heat conductive layer 140. At this time, the first heat conductive layer 140 may be a thermal paste, and thus, any gaps between the plurality of thermoelectric elements 210 and the thermal block 110 may be thoroughly filled.

A heat dissipation unit 400 may be provided below the thermoelectric element 210. The thermoelectric element 210 is thermally connected to the heat sink 410 of the heat dissipation unit 400. The heat transfer module 200 according to an embodiment of the present disclosure may further include a second heat conductive layer 220 that thermally connects the thermoelectric element 210 and the heat sink 410.

The second heat conductive layer 220 may be a thermally conductive component, for example, a thermally conductive plate, foil, film, grease, or the like. The second heat conductive layer 220 of the heat transfer module 200 according to an embodiment of the present disclosure may be a thermal paste, like the first heat conductive layer 140 of the thermal block unit 100. The first heat conductive layer 140 and the second heat conductive layer 220 may function to improve heat dissipation, thermal conductivity, or the like, or to improve thermal connectivity between the thermal block 110, the thermoelectric element 210, and the heat sink 410.

Figure 3:
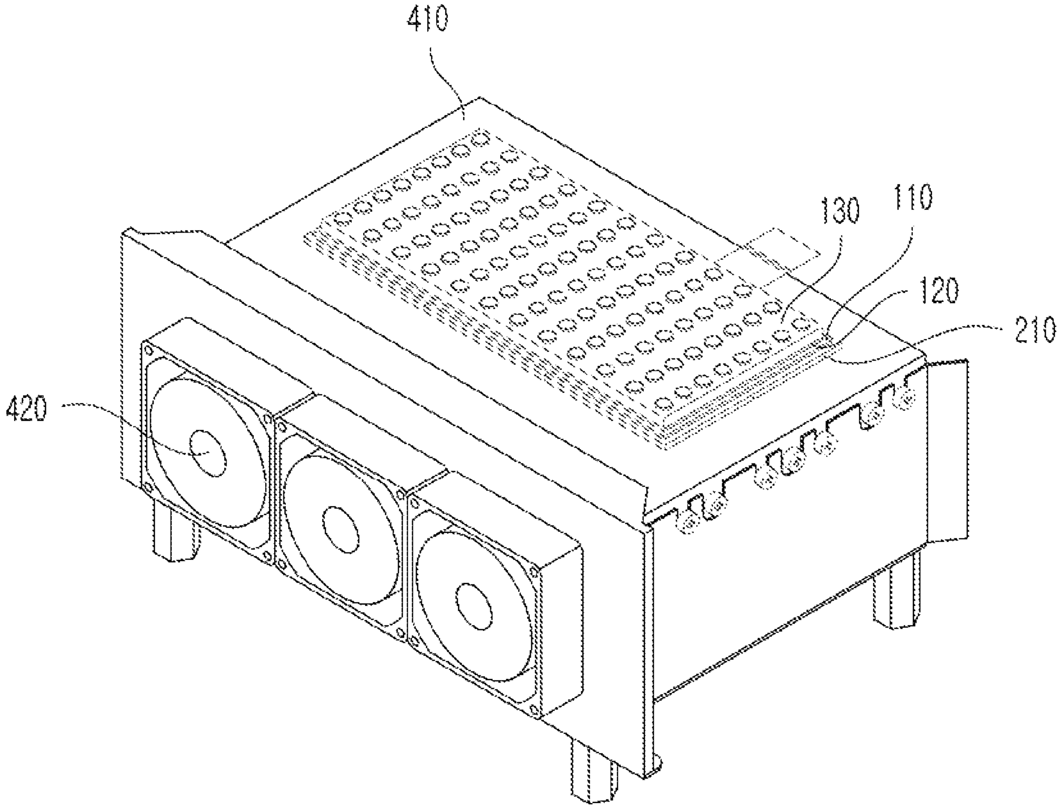
FIG. 3 is a perspective view illustrating a thermal block unit coupled to a heat dissipation unit according to an embodiment of the present disclosure.

The heat dissipation unit 400 will be described with further reference to FIG. 3. FIG. 3 is a perspective view illustrating a state in which a thermal block unit 100 is coupled to a heat dissipation unit 400 according to an embodiment of the present disclosure. The heat dissipation unit 400 according to an embodiment of the present disclosure includes a heat sink 410 thermally connected to the heat transfer module 200, and a heat dissipation fan 420 operated to lower the temperature of the heat sink 410.

The heat sink 410 of the heat dissipation unit 400 according to an embodiment of the present disclosure is a component used as a passive heat exchanger to efficiently dissipate heat from the thermal block 110 and/or the thermoelectric element 210. As shown in FIG. 3, the heat sink 410 may be positioned below the thermoelectric element 210. That is, the heat sink 410 may be disposed to be in close contact with the thermoelectric element 210 and may be thermally connected via the second heat conductive layer 220 (see FIG. 1).

In addition, the heat dissipation unit 400 may further include a heat dissipation fan 420. The heat dissipation fan 420 can be turned on and off in order to control the temperature of the thermal block 110. The heat dissipation fan 420 may be disposed at a position capable of dissipating heat from the thermal block 110. Preferably, the heat dissipation fan 420 cools the heat sink 410 thermally connected to the thermal block 110 rather than directly cooling the thermal block 110.

According to an embodiment, the heat dissipation fan 420 may generate an air flow by rotation via a motor to cool down the heat sink 410 and in turn, may cool down the thermal block 110. A variety of known heat dissipation fans may be used as the heat dissipation fan 420. For example, axial fans, centrifugal fans and cross flow fans can be used.

A heat dissipation fan 420 moves air across the heat sink 410 to cool the components thermally coupled to the heat sink 410. For example, in a sample heating device that is thermally connected in the order of: the thermal block 110, the thermoelectric element 210, and the heat sink 410, the heat dissipation fan 420 contributes to cooling the said components, and in particular, ultimately contributes to cooling the thermal block 110.

When the heat dissipation fan 420 generates an air flow to cool the heat sink 410, the heat dissipation fan 420 may be positioned at the bottom, front, rear, left side, right side of the heat sink 410, or a combination of the same, to cool the heat sink 410. According to an embodiment, the position of the heat dissipation fan 420 is determined in consideration of the arrangement direction of the heat dissipation fins of the heat sink 410.

Figure 4:
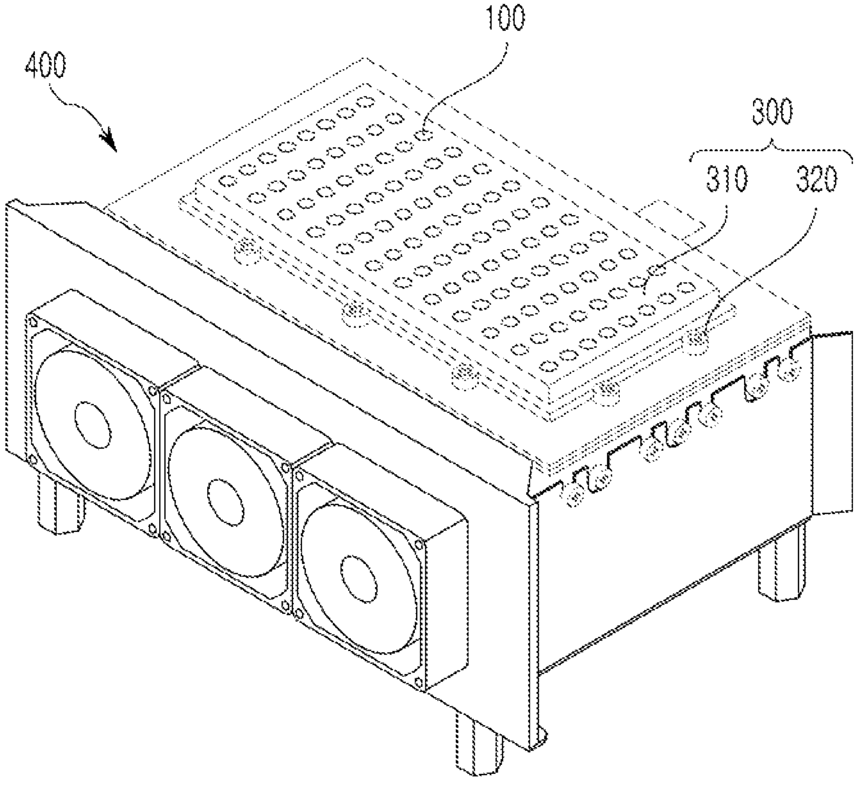
FIG. 4 is a perspective view illustrating a clamping unit coupled to a heat dissipation unit according to an embodiment of the present disclosure.

The clamping unit 300 will be described with further reference to FIG. 4. FIG. 4 is a perspective view illustrating a state in which the clamping unit 300 according to an embodiment of the present disclosure is combined with the heat dissipation unit 400.

The clamping unit 300 according to an embodiment of the present disclosure includes a clamp 310 that covers the thermal block unit 100, and a clamp fixture 320 for fixing the clamp 310 to the heat dissipation unit 400. The clamp 310 according to an embodiment of the present disclosure may be installed to apply pressure on the base portion 112 of the thermal block 110. In addition, the clamp 310 may be fabricated in a plate shape having a stepped portion of a predetermined height so as to press the thermal block 110, the heating plate 120, and the heat insulating plate 130 together in close contact with each other.

In addition, the periphery of the clamp 310 may be formed to have a shape and size corresponding to the periphery of the edge insulator 150. At this time, the clamp 310 and the edge insulator 150 may be coupled to each other via the clamp fixture 320. The clamp fixture 320 may be a fixing means such as a screw, and the clamp 310 and the edge insulator 150 may be screw-coupled by forming holes at corresponding positions.

Figure 5:
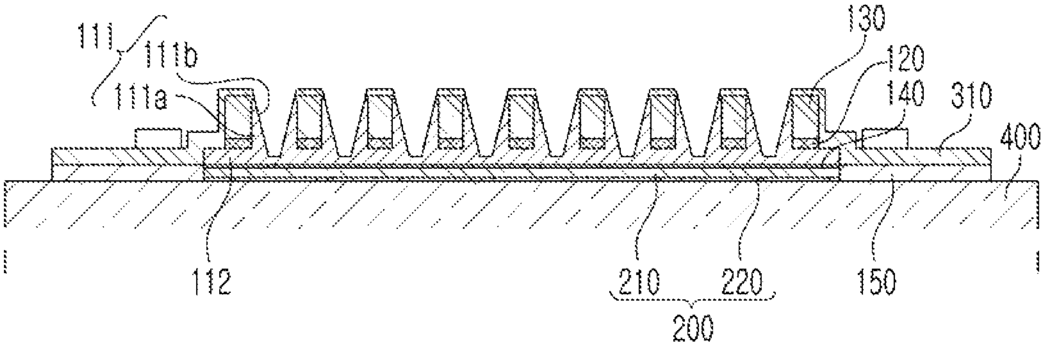
FIG. 5 is a longitudinal cross-sectional view of a sample heating apparatus according to an embodiment of the present disclosure.

Next, the arrangement of the components of the sample heating apparatus and the shape of the thermal block 110 according to an embodiment of the present disclosure will be described with further reference to FIG. 5. FIG. 5 is a longitudinal cross-sectional view for explaining the configuration of a sample heating apparatus according to an embodiment of the present disclosure.

As shown in FIG. 5, on one surface of the thermal block 110, a plurality of accommodating portions 111 may be formed to protrude upward from the base portion 112. The plurality of accommodating portions 111 are preferably arranged evenly spaced from each other. Each of the accommodating portions 111 may include a cylindrical body 111*a*, and a conical recess 111*b* formed in the cylindrical body 111*a*. The conical recess 111*b* may be manufactured such that its internal inclination is determined to stably accommodate a reaction vessel 10 (see FIG. 6).

The heating plate 120 according to an embodiment of the present disclosure has a plurality of holes formed in a shape corresponding to the plurality of cylindrical bodies 111*a*. The heating plate 120 may be positioned in close contact with the base portion 112. In another embodiment, a heat-conducting layer (not shown) may be additionally provided between the upper surface of the base portion 112 and the heating plate 120, and they are also in a thermally connected state in this case.

Similar to the heating plate 120, the heat insulating plate 130 according to an embodiment of the present disclosure also has a plurality of holes formed in a shape corresponding to the plurality of cylindrical bodies 111*a*. The heat insulating plate 130 may be fabricated of a porous polymer, for example, a silicone sponge, and preferably has a thickness proportional to the height of the cylindrical body 111*a*.

In one embodiment of the present disclosure, when the heat insulation plate 130 is installed on the thermal block 110, preferably, the thickness of the heat insulation plate 130 may be determined such that the upper surface of the heat insulation plate 130 is positioned on a plane higher than the upper surface of the cylindrical body 111*a*. In this case, the heat insulating plate 130 may be pressed more closely to the thermal block 110 by the clamp 310. In another embodiment, the upper surface of the heat insulation plate 130 and the upper surface of the cylindrical body 111*a* may be located on the same plane. This way, the heat insulation plate 130 can fully enclose and insulate the outer surface of the cylindrical body 111*a* of the thermal block 110.

The thermal block 110 is thermally connected to the thermoelectric element 210 by the first heat conductive layer 140, and the thermoelectric element 210 may be thermally connected to the heat dissipation unit 400 via the second heat conductive layer 220 positioned under the thermoelectric element 210. The edge insulator 150 is formed to surround and insulate the edges of the first heat conductive layer 140, the thermoelectric element 210, and the second heat conductive layer 220. At this time, the first heat conductive layer 140 and the second heat conductive layer 220 may be installed with the same material, but is not limited thereto.

Figure 6:
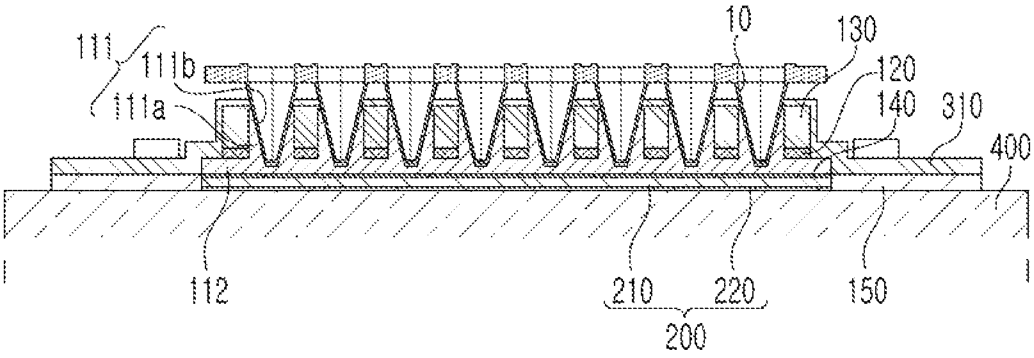
FIG. 6 is a longitudinal cross-sectional view illustrating a sample plate placed on the sample heating apparatus according to an embodiment of the present disclosure.

Further referring to FIG. 6, a reaction vessel 10 is described. FIG. 6 is a longitudinal cross-sectional view illustrating a sample plate placed on the device for heating a sample according to an embodiment of the present disclosure. As shown in FIG. 6, the reaction vessel may be a sample plate, more particularly, a 96-well plate that fits within the conical recesses 111*b* of the thermal block 110.

Although in FIG. 6, the reaction vessel 10 is shown as a sample plate, in the present disclosure, the reaction vessel 10 refers to a system in which a nucleic acid reaction is performed, and a test tube, a PCR tube, a strip tube, a vial, a multi-well PCR plate, a microtiter plate, a capillary tube, are all examples of a reaction vessel. One or more reaction vessels may be used in the device for heating a sample according to the present disclosure. According to the shape and size of the reaction vessel 10, the conical recesses 111*b* may vary in shape, size and arrangement on the thermal block 110.

What is claimed is:

1. A device for heating a sample, comprising:
a thermal block unit accommodating a reaction vessel;
a heat transfer module thermally connected to the thermal block unit; and
a heat sink thermally connected to the heat transfer module,
wherein the thermal block unit comprises:
a thermal block having a plurality of accommodating portions for accommodating the reaction vessel; and
a heating plate having a plurality of holes into which the plurality of accommodating portions are inserted.

2. The device of claim 1, wherein the heating plate comprises an edge region and a central region, the edge region having a greater power density than the central region.

3. The device of claim 1, wherein the heating plate is a flexible printed circuit board (FPCB).

4. The device of claim 1, wherein the thermal block comprises a base portion, and the plurality of accommodating portions are formed protruding from the base portion.

5. The device of claim 4, wherein the plurality of accommodating portions each comprise a cylindrical body and a conical recess formed in the cylindrical body.

6. The device of claim 4, further comprising an edge insulator enclosing the periphery of the base portion.

7. The device of claim 4, wherein the base portion is thermally connected to the heat transfer module via a heat conducting layer.

8. The device of claim 7, wherein the heat transfer module comprises a Peltier element.

9. The device of claim 6, further comprising a clamp coupled to the edge insulator.

10. The device of claim 9, wherein the clamp is installed to press the base portion.

11. The device of claim 4, further comprising a heat insulating plate having a plurality of holes into which the plurality of accommodating portions is inserted.

12. The device of claim 11, wherein the heat insulating plate is a porous polymer.

13. The device of claim 12, wherein the porous polymer is a silicone sponge.

14. The device of claim 11, wherein the heating plate is disposed between the heat insulating plate and the base portion.

* * * * *